US012434791B2

United States Patent
Peberdy

(10) Patent No.: US 12,434,791 B2
(45) Date of Patent: Oct. 7, 2025

(54) MOORING BUOY

(71) Applicant: Stillstrom A/S, Copenhagen (DK)

(72) Inventor: Philip Peberdy, Lyngby (DK)

(73) Assignee: Stillstrom A/S, Copenhagen (DK)

( * ) Notice: Subject to any disclaimer, the term of this patent is extended or adjusted under 35 U.S.C. 154(b) by 704 days.

(21) Appl. No.: 17/779,506

(22) PCT Filed: Nov. 23, 2020

(86) PCT No.: PCT/DK2020/050321
§ 371 (c)(1),
(2) Date: May 24, 2022

(87) PCT Pub. No.: WO2021/104588
PCT Pub. Date: Jun. 3, 2021

(65) Prior Publication Data
US 2023/0002013 A1    Jan. 5, 2023

(30) Foreign Application Priority Data

Nov. 25, 2019    (DK) .............................. PA201901378

(51) Int. Cl.
*B63B 22/02*    (2006.01)
*B63B 21/20*    (2006.01)
(Continued)

(52) U.S. Cl.
CPC .............. *B63B 22/02* (2013.01); *B63B 21/20* (2013.01); *H02G 11/003* (2013.01);
(Continued)

(58) Field of Classification Search
CPC ....... B63B 22/00; B63B 22/02; B63B 22/026; B63B 21/20; B63B 2021/203;
(Continued)

(56) References Cited

U.S. PATENT DOCUMENTS

| 5,044,297 A | 9/1991 | de Baan et al. |
| 5,288,253 A | 2/1994 | Urdshals et al. |

(Continued)

FOREIGN PATENT DOCUMENTS

| DE | 594833 C | 3/1934 |
| EP | 2990323 A1 | 3/2016 |

(Continued)

OTHER PUBLICATIONS

1 Extended European Search Report for European Application No. 20894782.0 mailed Dec. 11, 2023.

(Continued)

*Primary Examiner* — Daniel V Venne
(74) *Attorney, Agent, or Firm* — EIP US LLP

(57) ABSTRACT

A mooring buoy for a vessel comprises a floating body arranged to project out of the water. At least one buoy anchoring line is connected between the floating body and sea floor. At least one vessel mooring line is connectable between the mooring buoy and the vessel. At least one moveable electric cable is connected to a power supply and the moveable electric cable has a free end connectable to a switchboard of the vessel when the vessel is tethered to the at least one vessel mooring line. The free end of the at least one moveable electric cable is moveable between a retracted position and a connected position and the tension of the at least one vessel mooring line is greater than the tension in the at least one moveable electric cable when the free end of the at least one moveable electric cable is in the connected position.

22 Claims, 8 Drawing Sheets

(51) Int. Cl.
*H01B 7/14* (2006.01)
*H02G 11/00* (2006.01)
*H02G 15/04* (2006.01)

(52) U.S. Cl.
CPC ........ *H02G 15/04* (2013.01); *B63B 2021/203* (2013.01); *H01B 7/14* (2013.01)

(58) Field of Classification Search
CPC . B63J 2003/043; H02G 11/003; H02G 15/04; H01B 7/14
USPC .............................................................. 441/3
See application file for complete search history.

(56) References Cited

U.S. PATENT DOCUMENTS

| | | | |
|---|---|---|---|
| 6,415,828 | B1 | 7/2002 | Duggal et al. |
| 11,267,535 | B2 * | 3/2022 | Platè ........................ B63B 22/02 |
| 12,151,786 | B2 * | 11/2024 | Andersen .............. B63B 21/507 |
| 2007/0231072 | A1 | 10/2007 | Jennings et al. |
| 2010/0112879 | A1 | 5/2010 | De Ocariz et al. |
| 2013/0266381 | A1 | 10/2013 | Pettersen |
| 2014/0190385 | A1 | 7/2014 | Colquhoun |

FOREIGN PATENT DOCUMENTS

| | | |
|---|---|---|
| GB | 2250253 A | 6/1992 |
| GB | 2273087 A | 6/1994 |
| JP | S52137887 A | 11/1977 |
| JP | S59189431 U | 12/1984 |
| WO | WO-9815449 A1 | 4/1998 |
| WO | WO-2014092622 A1 | 6/2014 |

OTHER PUBLICATIONS

International Search Report for International Application No. PCT/DK2020/050321 dated Jan. 26, 2021.
Danish Search Report For Danish Patent Application No. PA201901378 dated Jun. 26, 2020.
Danish Search Report for Danish Patent Application No. PA201901378 dated Dec. 7, 2020.

* cited by examiner

MOORING BUOY

CROSS-REFERENCE TO RELATED APPLICATION(S)

This application is the National Phase under 35 U.S.C. § 371 of PCT International Application No. PCT/DK2020/050321, which has an international filing date of Nov. 23, 2020, which designated the United States of America and which claims priority to Danish Patent Application No. PA201901378, filed Nov. 25, 2019, the entire contents of each of which are incorporated herein by reference.

FIELD

The present invention relates to a mooring buoy for a vessel. In particular the present invention relates to a mooring buoy for providing power to the vessel.

BACKGROUND

In the maritime industry it is often required to moor vessels when they are not in operation. In some locations, quayside space is at a premium and there is not enough space for every vessel dock. Accordingly some vessels are moored offshore to a mooring buoy while the vessel waits to dock or before the vessel is deployed.

In most circumstances, the vessel will consume energy even when moored. This is because a moored vessel may have a residual "hotel load" and the command bridge and the instruments on the command bridge. For example, the crew accommodation will require lighting and heating which consumes power. A moored vessel may also need to carry out some deck operations with equipment that will also require power. Accordingly, a moored vessel may operate a primary or an auxiliary genset to provide power for the hotel load.

This is undesirable because running the primary or auxiliary genset for only a hotel load will inefficiently consume fuel and emit exhaust emissions such as particulate pollution and CO2 emissions. This may be particularly an issue if the vessel is moored close to shore within a low emissions zone.

In order to reduce emissions of moored vessels, it is known to "cold iron" vessel by providing an external power supply to the moored vessel. This means that the primary or auxiliary genset of the vessel does not need to be operational when the vessel is moored or at berth in a port.

Once such known solution is shown in US2013/0266381 which discloses a transfer system for a subsea installation which is fixed to the seabed. The transfer system comprises a transfer element such as a cable for transferring an electric current to a floating arrangement such as a vessel. The transfer system comprises a subsea fender which holds the cable when not in use. A problem with this arrangement is that the electric able can be place under significant tension and damaged if the vessel moves or turns with respect to the transfer system due to wind shear or sea currents.

Furthermore, the transfer system requires the vessel to be using a dynamic positioning system and vessel thrusters in order to keep the vessel in the same location of the transfer system whilst the fluid is transferred to the vessel. Maintaining a dynamic positioning system will use fuel operating the thrusters and emit exhaust emissions. This means that transfer system is not practical for mooring the vessel for more than a few hours particularly if the location is close to shore.

SUMMARY

Examples of the present invention aim to address the aforementioned problems.

According to an aspect of the present invention there is a mooring buoy for a vessel comprising: a floating body arranged to project out of the surface of the water; at least one buoy anchoring line connected between the floating body and the sea floor; at least one vessel mooring line connectable between the mooring buoy and the vessel; and at least one moveable electric cable connected to a power supply and the moveable electric cable has a free end connectable to a switchboard of the vessel when the vessel is tethered to the at least one vessel mooring line; wherein the free end of the at least one moveable electric cable is moveable between a retracted position and a connected position and the tension of the at least one vessel mooring line is greater than the tension in the at least one moveable electric cable when the free end of the at least one moveable electric cable is in the connected position.

This means that when the vessel is moored to the mooring buoy, the consumption of marine diesel oil or marine gas oil for the vessels wait outside of the port is eliminated or greatly reduced. When the vessel is anchored and stationary, the energy requirements to power auxiliary applications (such as compressors and/or winches) can be met with the mooring buoy. This means that vessels moored to the mooring buoy can draw on electricity generated from wind farms or direct from shore power. Accordingly this reduces greenhouse gas emissions (GHG) and particulates that can move towards the shore depending on location, wind, and weather conditions. By connecting a vessel directly to a mooring buoy with an electricity input, efficiency of the vessel marine engines is improved.

Optionally, the mooring buoy comprises a rotatable electrical connection coupled between the at least one moveable electric cable and an input subsea cable.

Optionally, the rotatable electrical connection is an electrical slip ring.

Optionally, the electrical slip ring is sealed in a canister configured to shield the marine environment from the electrical slip ring.

Optionally, the free end of the at least one moveable electric cable is adjacent to the floating body in the retracted position.

Optionally, the free end of the at least one moveable electric cable is arranged to retract towards the floating body when disconnected from the vessel.

Optionally, the at least one moveable electric cable is arranged to retract due to the weight of the at least one moveable electric cable.

Optionally, the moveable electric cable comprises a clump weight mounted on a portion of the at least one moveable electric cable.

Optionally, the floating body comprises a curved surface for limiting the bend radius of the at least one moveable electric cable.

Optionally, the floating body comprises a chute for receiving the at least one moveable electric cable.

Optionally, the at least one vessel mooring line is retractable towards the floating body.

Optionally, the at least one vessel mooring line is one or more of a line, wire, and/or chain.

Optionally, the free end of the at least one moveable electric cable comprises a magnetic connector.

Optionally, the free end of the at least one moveable electric cable comprises an electrical plug and/or an induction loop.

Optionally, the at least one moveable electric cable is connected to a transformer arranged to vary the voltage of the power supply in dependence of a vessel parameter.

Optionally, a controller is configured to send a control signal to the transformer to vary the voltage of the at least one moveable electric cable in dependence of a vessel parameter.

Optionally, the transformer is configured to supply the voltage at 440 V or 690V.

Optionally, the at least one buoy anchoring line is three buoy anchoring lines.

Optionally, the at least one moveable cable and the at least one vessel mooring line are rotatable about a central axis of the floating body.

Optionally, the at least one moveable cable and the at least one vessel mooring line are rotatable 360 degrees about the central axis of the floating body.

According to another aspect of the present invention there is a power system for an offshore vessel comprising: at least one mooring buoy according the previous aspect of the invention; and a transformer connected to the at least one mooring buoy and a power supply.

Optionally the power system comprises a plurality of mooring buoys.

According to yet another aspect of the present invention there is a method of mooring a vessel with a mooring buoy having a floating body arranged to project out of the surface of the water and at least one buoy anchoring line connected between the floating body and the sea floor, wherein the method comprises: connecting at least one vessel mooring line between the mooring buoy and the vessel; moving a free end of at least one moveable electric cable connected to a power supply between a retracted position and a connected position; connecting the free end of the at least one moveable electric cable to a switchboard of the vessel when the vessel is tethered to the at least one vessel mooring line; and tensioning the at least one vessel mooring line such that the tension in the at least one vessel mooring line is greater than the tension in the at least one moveable electric cable when the free end of the at least one moveable electric cable is in the connected position.

BRIEF DESCRIPTION OF THE DRAWINGS

Various other aspects and further examples are also described in the following detailed description and in the attached claims with reference to the accompanying drawings, in which:

DETAILED DESCRIPTION

Figure 1:
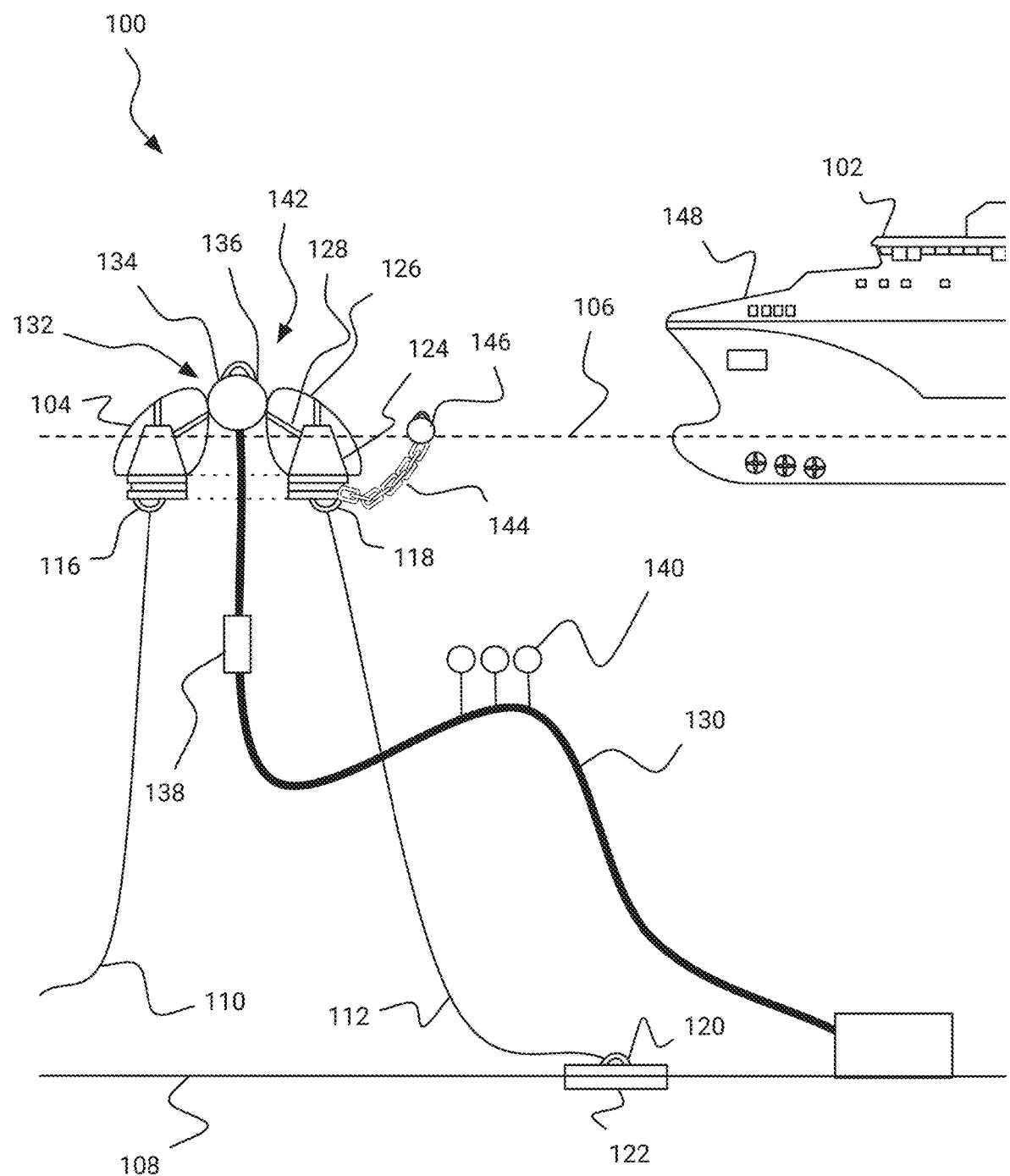
FIG. 1 shows a side view of a mooring buoy before the vessel has moored to the mooring buoy according to an example.

FIG. 1 shows a side view of a mooring buoy 100 before a vessel 102 has moored to the mooring buoy 100 according to an example. The vessel 102 as shown in FIG. 1 is partially shown for the purposes of clarity. The vessel 102 can be an anchor handling vessel, platform supply vessel (PSV), multipurpose support vessel (MSV), a tug boat, ice breaker, patrol boat, fishing vessel, coast guard vessel, navy vessel, fire-fighting vessel, container ship, bulk carrier, barge, tanker, or any other vessel which can be moored.

The mooring buoy 100 comprises a floating body 104 and at least a portion of the floating body 104 projects out of the surface 106 of the water. The portion of the floating body 104 that projects out of the water can be brightly coloured for contrasting with the water. In some examples, one or more beacons (not shown) can be mounted on the floating body 104 for alerting vessels of the presence of the mooring buoy 100.

In some examples, the mooring buoy 100 is anchored to the sea floor 108 with a plurality buoy anchoring lines 110, 112, 114 connected between the floating body 104 and the sea floor 108. The buoy anchoring lines 110, 112, 114 are connected to the floating body 104 at one or more mooring eyes 116, 118 fixed to the floating body 104. In some examples, the buoy anchoring lines 110, 112, 114 are connected to the one or more mooring eyes 116, 118 via a shackle or a swivel mechanism (not shown) for allowing relative rotation between the buoy anchoring lines 110, 112, 114 and the one or more mooring eyes 116, 118.

The buoy anchoring lines 110, 112, 114 are connected to mooring eyes 120 of a sinker 122. In some examples, the buoy anchoring lines 110, 112, 114 are connected to the mooring eyes 120 of the sinker 122 via a shackle or a swivel mechanism (not shown) for allowing relative rotation between the buoy anchoring lines 110, 112, 114 and the one or more mooring eyes 120. The sinker 122 is embedded in the sea floor 108 or resting on the sea floor 108 and prevents the mooring buoy 100 from moving away from a predefined location. In some other examples, the sinker 122 can be replaced with an anchor (not shown) or any other suitable means for fixing the buoy anchoring lines 110, 112, 114 with respect to the sea floor 108. The sinker 122 can be made from concrete, cast iron, rock, bundles or used chain or any other suitable material.

The buoy anchoring lines 110, 112, 114 in some examples are chains or alternatively mooring ropes or wires. In other examples, the buoy anchoring lines 110, 112, 114 can be a combination of a chain, rope and/or wire. In some examples, the three buoy anchoring lines 110, 112, 114 comprise an UHMwPE (Ultra High Molecular weight Polyethylene) or HMPE (High Modulus Polyethylene) fibre such as "DYNEEMA®". In some examples, the mooring buoy 100 comprises a three-point mooring system using three buoy anchoring lines 110, 112, 114. Each of the buoy anchoring lines 110, 112, 114 is connected on the floating body 104 spaced apart circumferentially approximately at 120 degrees about the floating body 104 and respectively attached to separate sinkers 122.

The buoy anchoring lines 110, 112, 114 in some examples provide a slack mooring. In this way, when the loading on the mooring buoy 100 is at a maximum, the mooring buoy anchoring lines 110, 112, 114 catenary will meet the sea floor 108 some way from the sinker 122. By providing the buoy anchoring lines 110, 112, 114 with a chain on the sea floor 108, this increases the security of the mooring or may be used to reduce the size of the sinker. The slack mooring also allows the mooring buoy 100 to move up and down due to the heave motion of the water.

The floating body 104 of the mooring buoy 100 comprises one or more floatation devices 124 for increasing the buoyancy of the floating body 104. In some examples, the floatation devices 124 are surrounded with a curved surface 126. The curved surface 126 is mounted to the floatation devices 124 with one or more struts 128. In some examples, the curved surface 126 integral with the floatation devices 124 and no struts 128 are used.

The curved surface 126 is arranged to receive a portion of an electric cable 130. The curved surface 126 is profiled to define a maximum bend radius of the electric cable 130. In some examples, the curved surface 126 has a radius of between 1 m and 10 m. In some examples, the curved surface 126 has a radius of 5 m. In other examples, the curved surface 126 has a radius of 2 m, 3 m, 4 m, 6 m, 7 m, 8 m, 9 m, 15 m, or 20 m.

Figure 6:
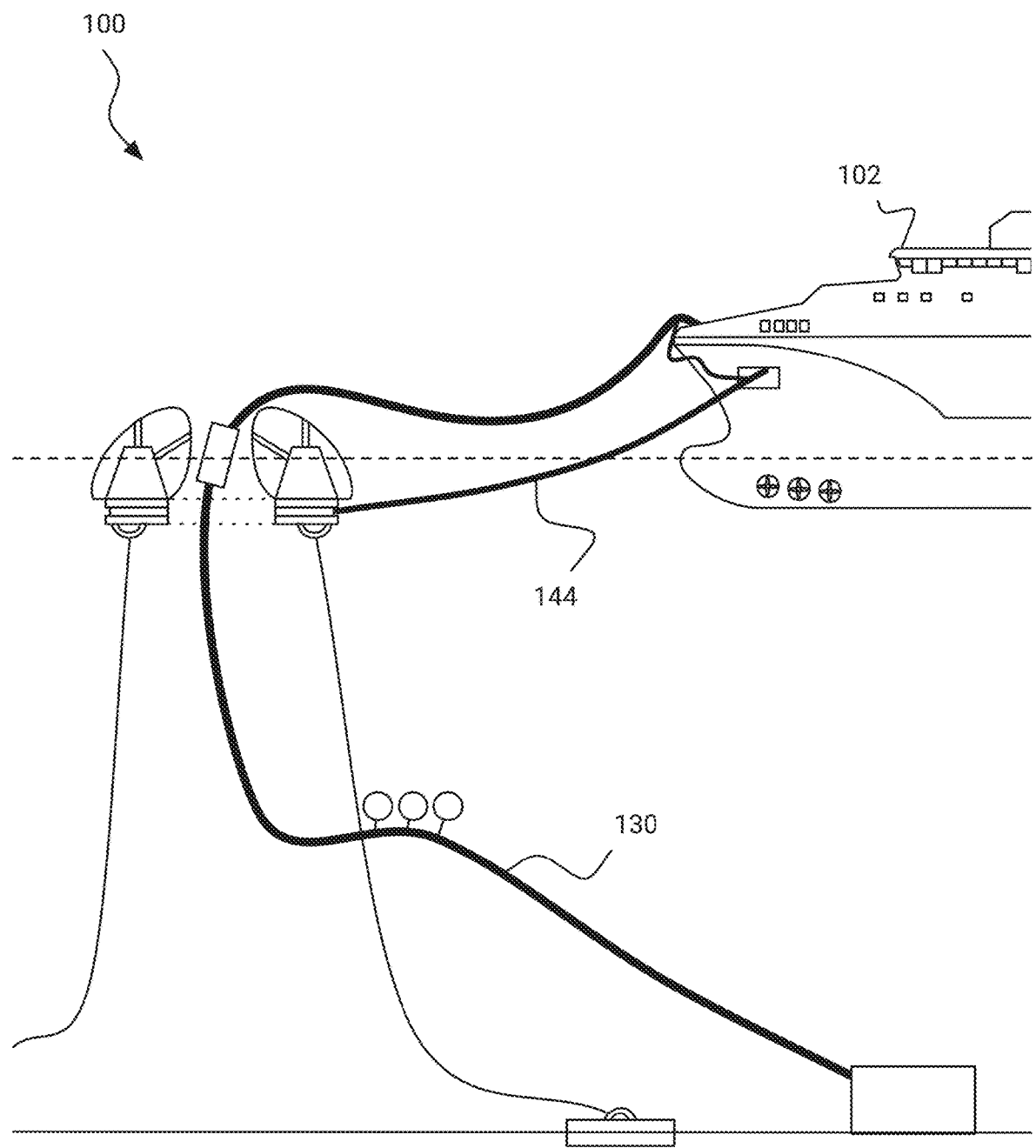
FIG. 6 shows a side view of a mooring buoy after the vessel has moored to the mooring buoy according to another example.

In some examples, the floating body 104 comprises a chute 142 with a hole 132 for receiving the electric cable 130 therethrough. The chute 142 defines a narrowing funnel for receiving and retaining a free end 134 of the electric cable 130. As shown in FIG. 1, the hole 132 is in the centre of the floating body 104 and concentric with the central axis A-A (as shown in FIG. 6). In some examples, the hole 132 is not concentric with the axis A-A and is instead located off-centre from the axis A-A. In other examples, the hole 132 is a cut-out (not shown) in the periphery of the floating body 104. By locating the hole 132 in the centre of the mooring buoy 100, the mooring buoy will be more stable when the electric cable 130 is resting on the curved surface 126.

Furthermore, the curved surface 126 of the chute 142 provides for a smoother recovery of the electric cable 130 when the electric cable 130 moves from the extended, connected position to the retracted position. The curved surface 126 of the chute 142 is smooth and prevents the electric cable 130 from snagging on the curved surface 126 when the electric cable 130 is being retracted.

Figure 8:
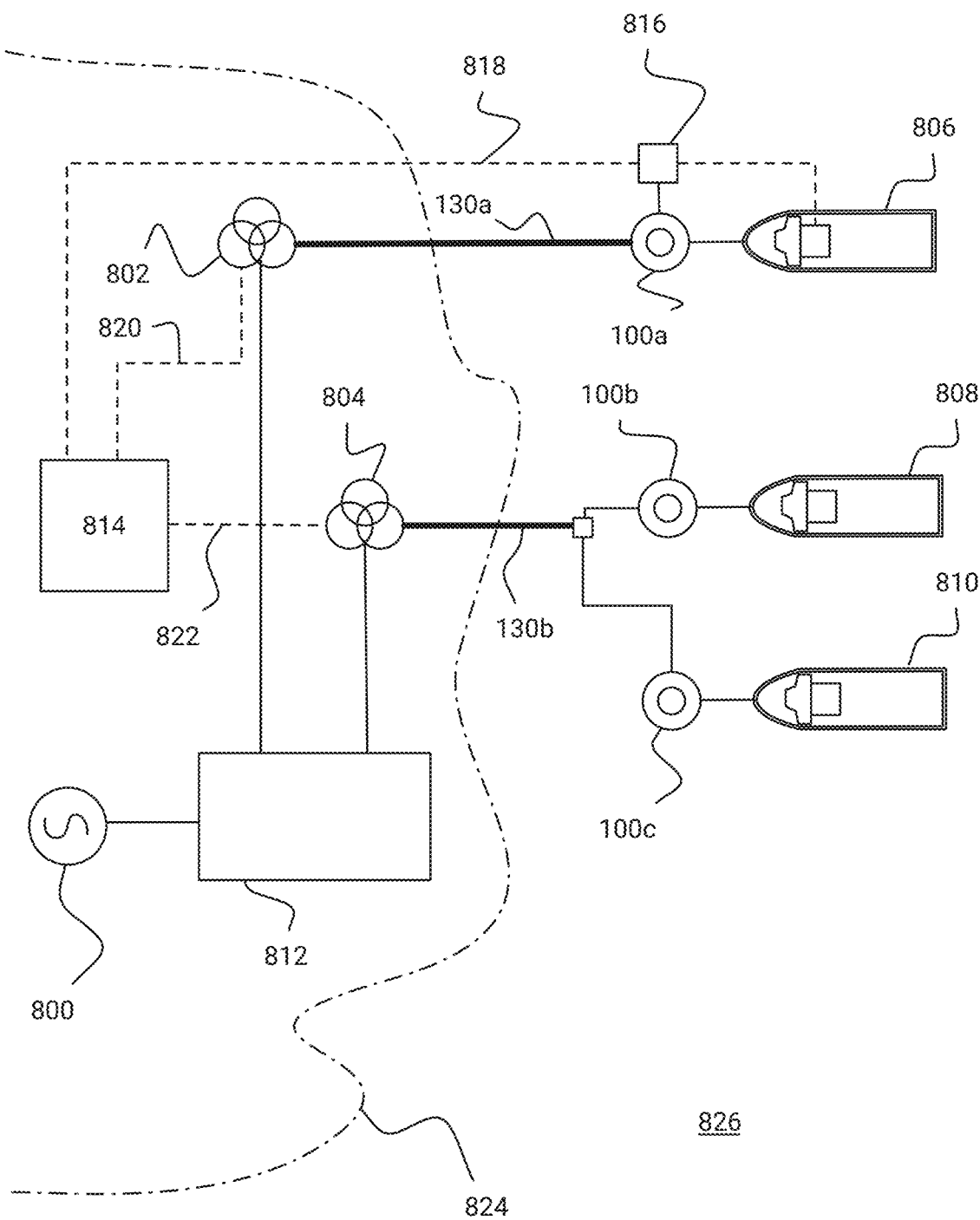
FIG. 8 shows a schematic diagram of a mooring buoy connected to a land-based power supply.

The electric cable 130 is connected to one or more transformers 802, 804 which are connected to a power supply 800 (as shown in FIG. 8). The power supply 800 in some examples is connected to a land-based electricity distribution network. In this way, the electric cable 130 connects the vessel 102 with shore power. Additionally or alternatively, the electric cable 130 can be connected to an offshore power supply, such as an offshore wind farm (not shown). In other examples, the electric cable 130 can be connected to an offshore installation comprising power generation or power storage.

Turning back to FIG. 1, the mooring buoy 100 will be discussed in further detail. The electrical cable 130 as shown in FIG. 1 is in a retracted position and the free end 134 of the electric cable 130 is moveable between the retracted position and an extended position. In the extended position, the electric cable 130 is connectable to the vessel 102. In this way the extended position and the connected position of the electric cable 130 as shown in the Figures are the same position.

In the extended position, the electric cable 130 can be connected to the vessel 102. The connection of the electric cable 130 to the vessel 102 will be discussed in further detail below.

The free end 134 of the electric cable 130 comprises a connector 136 for connection with a reciprocal connector (not shown) on the vessel 102. In some examples, the free end 134 of the electric cable 130 comprises a plug or socket for connecting respectively with a socket or plug in the switchboard (not shown) of the vessel 102. In some other examples, the free end 134 of the electrical cable 130 comprises an induction coil (not shown) for engagement with a reciprocal induction coil mounted on the vessel 102. The induction coils use electromagnetic induction for transfer of electrical energy to the vessel 102. In some examples, the free end 134 of the electric cable 130 comprises a magnetic connector for selectively engaging with the vessel 102.

In some examples, the free end 134 of the electric cable 130 comprises a plug or socket for connecting respectively with a socket or plug in the deck 148 of the vessel 102 for example, at the bow of the vessel 102. The socket or plug mounted in the deck of the vessel 102 is connected to the switchboard. In this way, when the free end 134 of the electric cable 130 is connected to the socket or plug in the deck 148 of the vessel 102, the electric cable 130 is electrically connected to the switchboard of the vessel 102. In some examples, the socket or plug in the deck 148 of the vessel 102 is retrofittable and a cable (not shown) extends from the bow, side or stern of the vessel 102 to the switchboard of the vessel 102.

As mentioned above, the connector 136 is coupled to the free end 134 of the electric cable 130 as shown in FIG. 1. In some examples, the connector 136 comprises an electric cable seating buoy 136 having a loop for pulling the electric cable 130 up to the vessel 102. The electric cable seating buoy 136 sits within the hole 132 when the electric cable 130 is in the retracted position. This means that the electric cable 130 is always in the same position with respect to the mooring buoy 100 when a vessel 102 moors to the mooring buoy 100. The electric cable seating buoy 136 has a diameter greater than the hole 132. Accordingly, when the electric cable 130 moves back to the retracted position, the free end 134 of the electric cable 130 does not pass through the hole 132. Furthermore, the electric cable seating buoy 136 being connected to the free end 134 of the electric cable 130 means that the electric cable 130 is not pulled up to the vessel 102 by the socket or plug connection. The electric cable seating buoy 136 may be removeable from the free end 134 of the electric cable 130 once the free end 134 of the electric cable 130 has been pull up to the deck 148 of the vessel 102.

In some examples, the electric cable 130 is arranged to be urged towards the retracted position. In some examples, the electric cable 130 is weighted and retracts back to the retracted position as shown in FIG. 1 due to the gravitational force on the electric cable 130. Alternatively, the electrical cable 130 can be retracted back to the retracted position with a winding mechanism such as a winch (not shown). In some examples, the electric cable 130 comprises a clump weight 138 for increasing the weight of the electric cable 130 and urging the electric cable 130 back to the retracted position.

As can be seen in FIG. 1, the clump weight 138 is positioned underneath the free end 134 and keeps the electric cable seating buoy 136 seated in the hole 132.

Optionally, the electric cable 130 comprises one or more buoyancy devices 140 mounted in the middle of the electric cable 130 to increase the buoyancy of a portion of the electric cable 130. In this way, the shape of the electric cable 130 adopts a "lazy wave", "s-shape" or "j-shape". The lazy wave shape of the electric cable 130 means that the electric cable 130 improves the strength and fatigue response whilst permitting the electric cable 130 to move between the retracted and the extended positions.

The mooring buoy 100 comprises at least one vessel mooring line 144 connectable between the mooring buoy 100 and the vessel 102. In some examples, the at least one vessel mooring line 144 are chains or alternatively mooring ropes or wires. In other examples, the one vessel mooring line 144 can be a combination of a chain, rope and/or wire. In some examples, the at least one vessel mooring line 144 comprises an UHMwPE (Ultra High Molecular weight Polyethylene) or HMPE (High Modulus Polyethylene) fibre such as "DYNEEMA®" (a trade mark of Royal DSM N.V.)

As shown in FIG. 1, there is a single vessel mooring line 144 for mooring the vessel 102 to the mooring buoy 100. The single vessel mooring line 144 is optionally a chain 144. FIG. 1 shows the single vessel mooring line 144 in a retracted position. Optionally, the single vessel mooring line 144 is retractable into the floating body 104 of the mooring buoy 100. In this way, the single vessel mooring line 144 is wound round the floating body 104. In some examples, the mooring buoy 100 comprises a winding mechanism (not shown) such as a winch for retracting and extending the single vessel mooring line 144 with respect to the mooring buoy 100. The end of the single vessel mooring line 144 is connected to a vessel mooring line location buoy 146.

Figure 4:
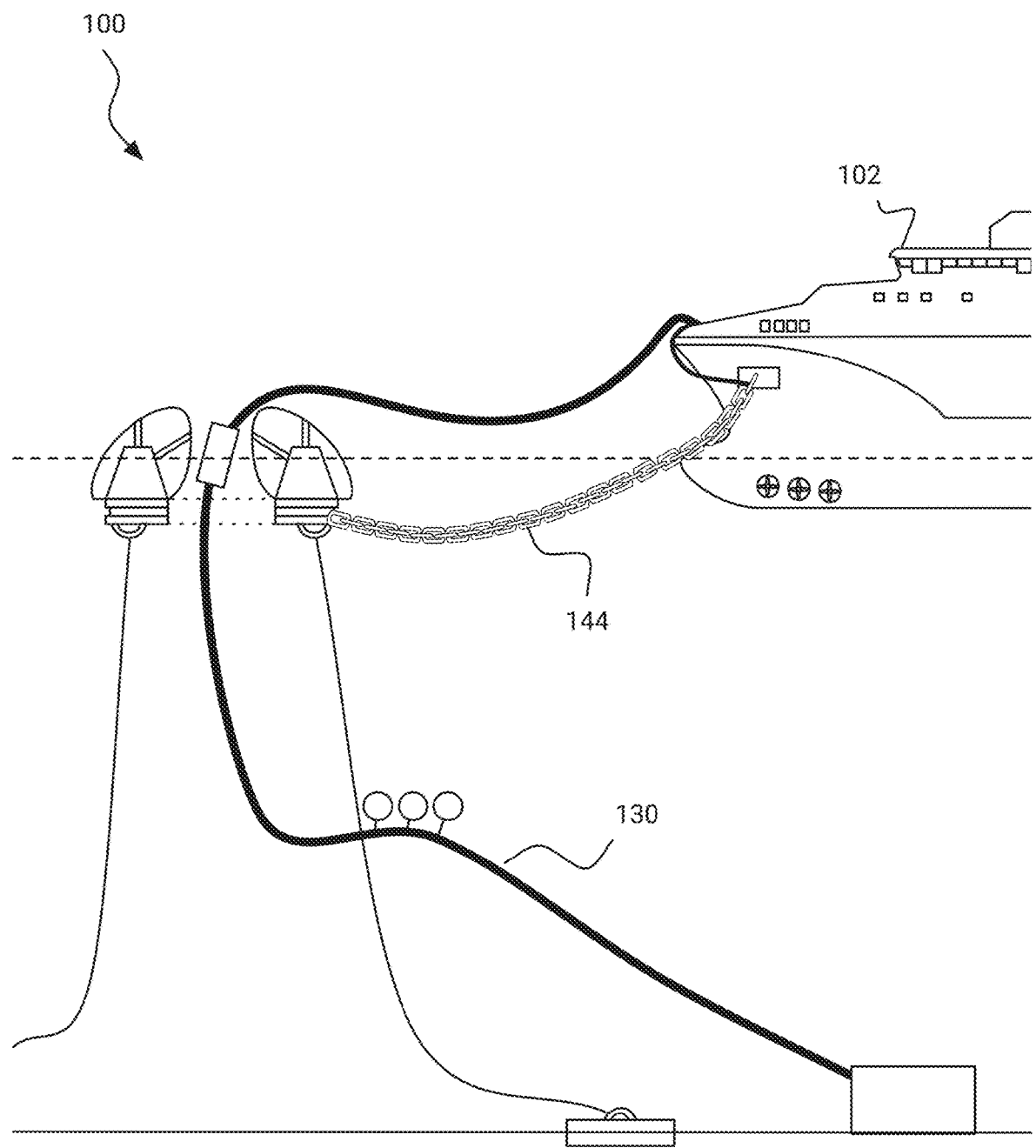
FIG. 4 shows a side view of a mooring buoy after the vessel has moored to the mooring buoy and connected to the electric cable according to an example.

Optionally, the single vessel mooring line 144 is not retractable and the single vessel mooring line 144 extends out from the mooring buoy 100 on the surface 106. This arrangement is shown in FIG. 4. In some examples, the vessel mooring line 144 is connected to a plurality of vessel mooring line location buoys 146 along its length. This means that the vessel mooring line 144 floats on the surface 106 of the water. Alternatively, the vessel mooring line 144 can be made from a material less dense than water such that it floats. For example, the vessel mooring line 144 comprise an UHMwPE (Ultra High Molecular weight Polyethylene) or HMPE (High Modulus Polyethylene) fibre with a density less than the density of fresh water or salt water.

In this way, the vessel mooring line 144 either floats on the surface 106 of the water or vessel mooring line 144 is retracted into the mooring buoy 100 when the vessel 102 is not moored to the mooring buoy 100. This means that the vessel mooring line 144 and the electric cable 130 in the retracted position cannot clash with each other.

Figure 2:
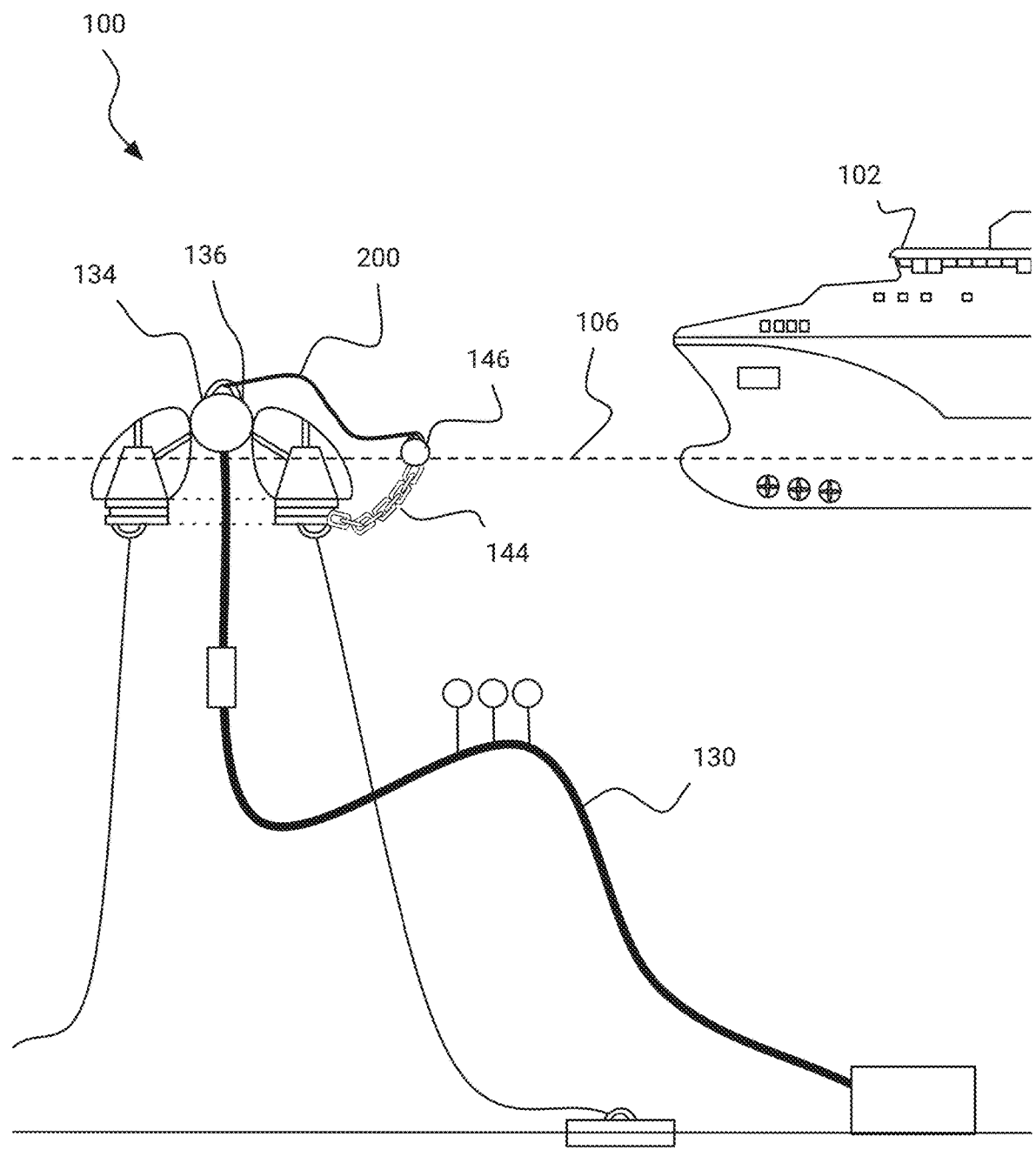
FIG. 2 shows a side view of a mooring buoy while the vessel is mooring to the mooring buoy according to an example.
Figure 3:
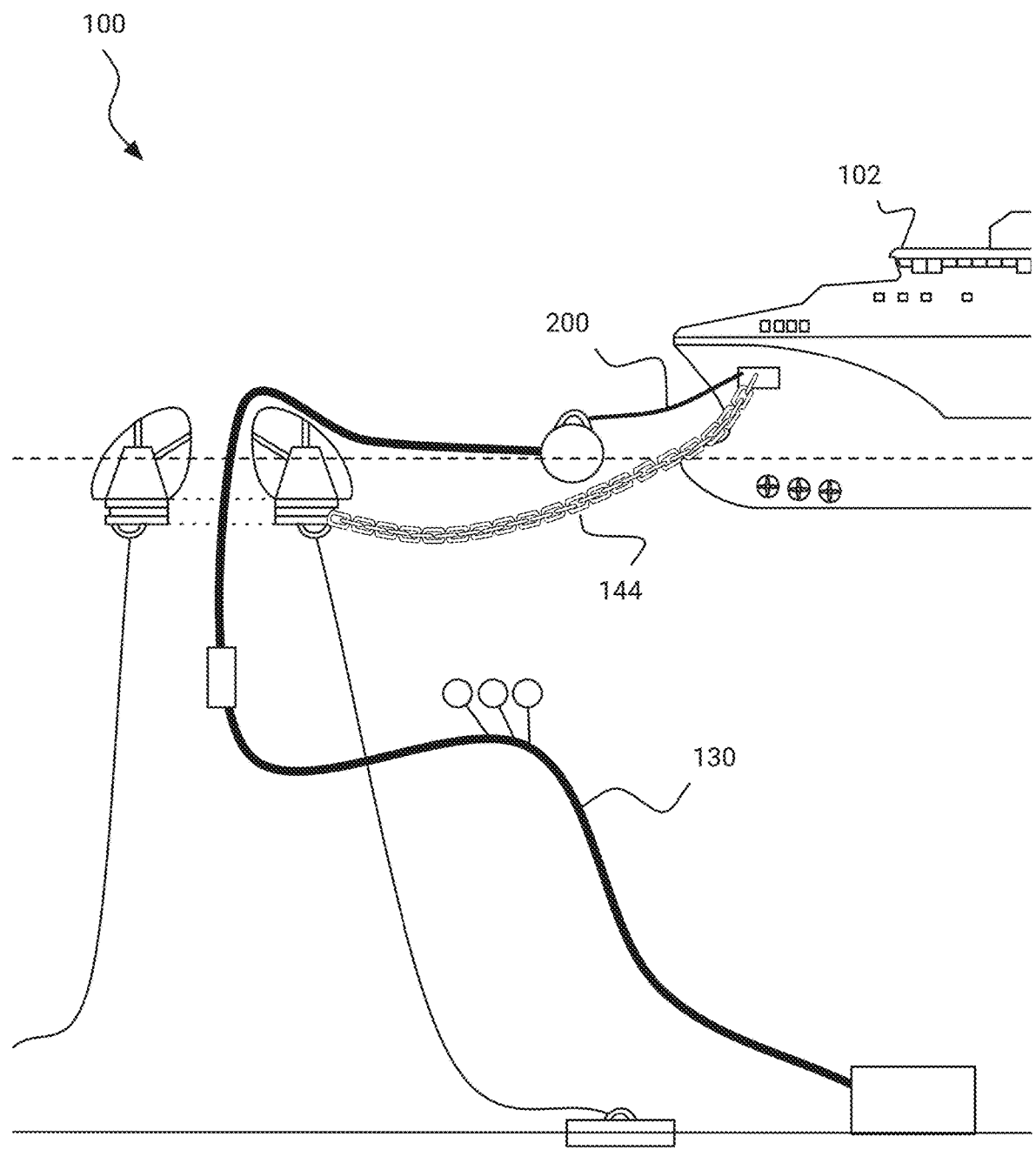
FIG. 3 shows a side view of a mooring buoy after the vessel has moored to the mooring buoy according to an example.

The operation of mooring a vessel 102 to the mooring buoy 100 will now be discussed in reference to FIGS. 1 to 4. FIG. 2 shows a side view of the mooring buoy 100 while the vessel 102 is mooring to the mooring buoy 100 according to an example. FIG. 3 shows a side view of the mooring buoy 100 after the vessel 102 has moored to the mooring buoy 100 according to an example. FIG. 4 shows a side view of the mooring buoy 100 after the vessel 102 has moored to the mooring buoy 100 and connected to the electric cable 130 according to an example.

In FIG. 1, the vessel 102 approaches the mooring buoy 100. The vessel 102 approaches the vessel mooring line 144 and/or the vessel mooring line location buoys 146. A deckhand will secure and lift the vessel mooring line location buoys 146 on to the deck 148. The deckhand may use lifting or winching equipment (not shown) for lifting the vessel mooring line location buoys 146. Messenger lines (not shown) may be attached to the vessel mooring line 144 in order to initially lift a portion of the vessel mooring line 144 on to the lifting or winching equipment.

Optionally, the free end 134 of the electric cable 130 is connected to the vessel mooring line 144. As shown in FIG. 2, the free end 134 of the electric cable 130 is connected to the vessel mooring line 144 via a connecting line 200. FIG. 2 is the same as FIG. 1 except the connecting line 200 is shown. Accordingly, when the vessel mooring line 144 is moved away from the mooring buoy 100, the electric cable 130 is also pull away from the mooring buoy 100. The connecting line 200 means that capture of the electric cable 130 is easier because the deckhand can pull the connecting line 200 once the vessel mooring line 144 has been captured. This reduces the number and complexity of the mooring and tethering of the vessel mooring line 144 and the electric cable 130.

In some examples, the connecting line 200 is replaced with a rigid rod (not shown). The rigid rod maintains a fixed distance between ends of the vessel mooring line 144 and the electric cable 130.

The connecting line 200 can be sufficiently long, that the chain of the vessel mooring line 144 forms a low enough catenary that the vessel mooring line 144 before the electric cable 130 is extended. In this way, even if the electric cable 130 sags into the water, the electric cable 130 does not sink low enough into the water to clash with the vessel mooring line 144.

In some examples, there is no connecting line 200. In this way, the vessel mooring line 144 is drawn up to the vessel 102 and then the electric cable 130 is drawn up to the vessel 102.

Turning to FIG. 3, the mooring process will be described in further detail. The vessel 102 as shown in FIG. 3 has now moored to the vessel mooring line 144 but the electric cable 130 is still to be connected to the vessel 102. The vessel mooring line 144 is secured to a capstan (not shown) or another suitable mooring point on the vessel 102. The connecting line 200 is pulled on to the deck 148 of the vessel at the same time as the vessel mooring line 144. The connecting line 200 is then used to pull up the electric cable 130 on to the vessel 102.

Similar to the mooring buoy 100, the vessel 102 can comprise a bend limiter on the periphery of the vessel 102. The bend limiter can be a curved fender or a roller for passing the electric cable 130 onto the deck 148 of the vessel 102.

FIG. 4 shows both the vessel mooring line 144 and the electric cable 130 connected to the vessel 102. When the free end 134 of the electric cable 130 is in the connected position and extended from the mooring buoy 100, the tension in the vessel mooring line 144 is greater than the tension in the electric cable 130. This means that the electric cable 130 will always be slack and not under excessive force that can damage or break the electric cable 130. In some examples, the vessel mooring line 144 is shorter than then the electric cable 130. This means that the vessel mooring line 144 will experience tension forces and not the electric cable 130 due to the relative motion of the vessel 102 and the mooring buoy 100 due to the motion of the water.

Figure 5:
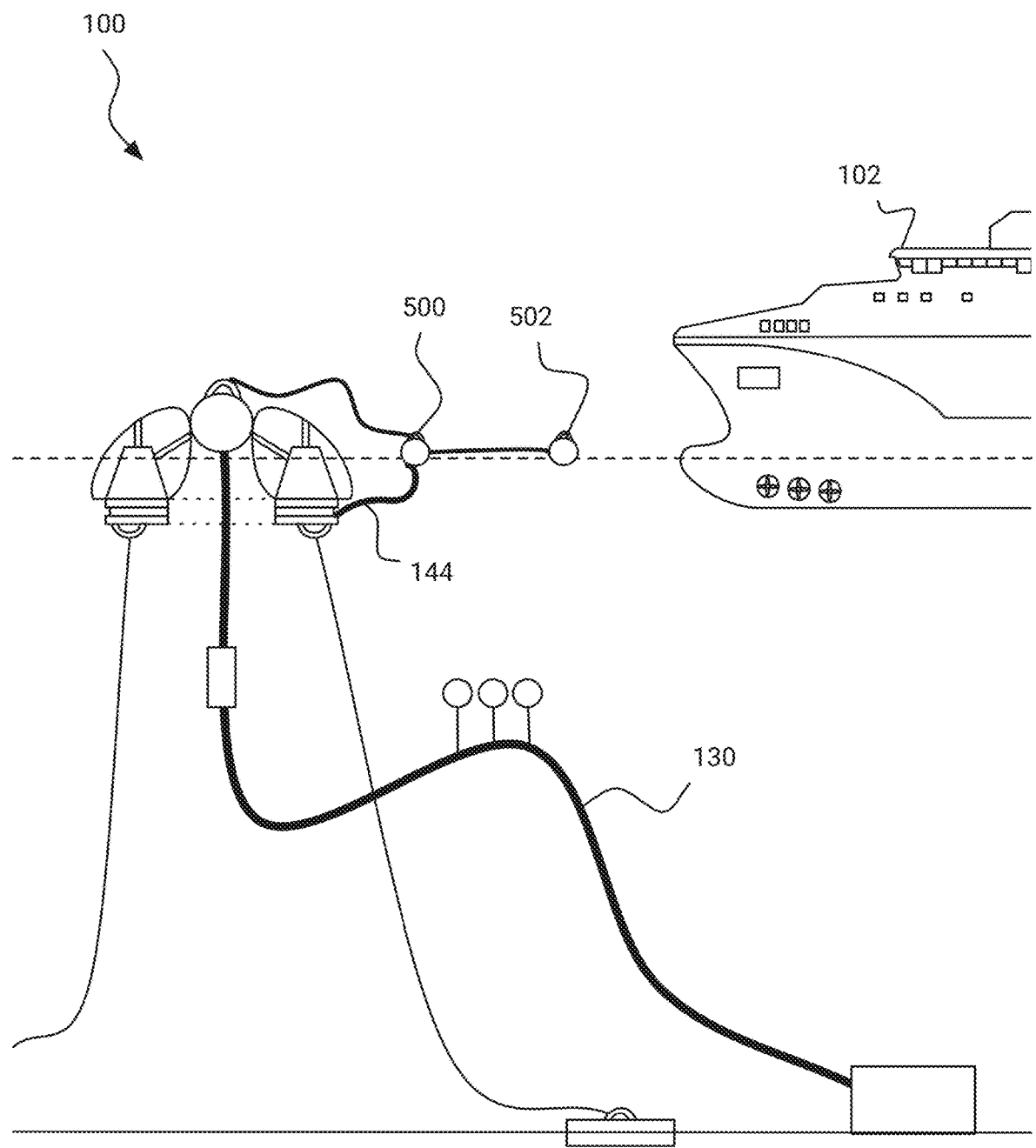
FIG. 5 shows a side view of a mooring buoy before the vessel has moored to the mooring buoy according to another example.

Turning to FIGS. 5 and 6, another example will now be discussed. FIGS. 5 and 6 respectively show a side view of the mooring buoy 100 before and after the vessel 102 has moored to the mooring buoy 100 according to another example.

FIGS. 5 and 6 are the same as FIGS. 1 to 4 except that the vessel mooring line 144 has been replaced with a mooring rope or wire instead of a chain. Furthermore a first vessel mooring line location buoy 500 is connected to a second vessel mooring line location buoy 502. The second vessel mooring line location buoy 502 can extend a sufficient distance from the mooring buoy 100 that the vessel 102 does not have to get too close to the mooring buoy 100. In this way, the second vessel mooring line location buoy 502 is pulled up on to the deck 148 before the first vessel mooring line location buoy 500.

Optionally in some examples, the floating body 104 comprises an upper first portion 700 which is rotatably mounted on a lower second portion 702. The upper first portion 700 comprises the curved surface 126 of the chute 142. This means that the upper first portion 700 is rotatable with respect to the lower portion 702 about the central axis A-A. This means that the electrical cable 130 and the vessel mooring line 144 are rotatable about the central axis A-A when the upper first portion 700 rotates with respect to the lower second portion 702. In this way, the mooring buoy 100 is a single point mooring buoy with a swivel connection for both the electric cable 130 and the vessel mooring line 144.

Figure 7:
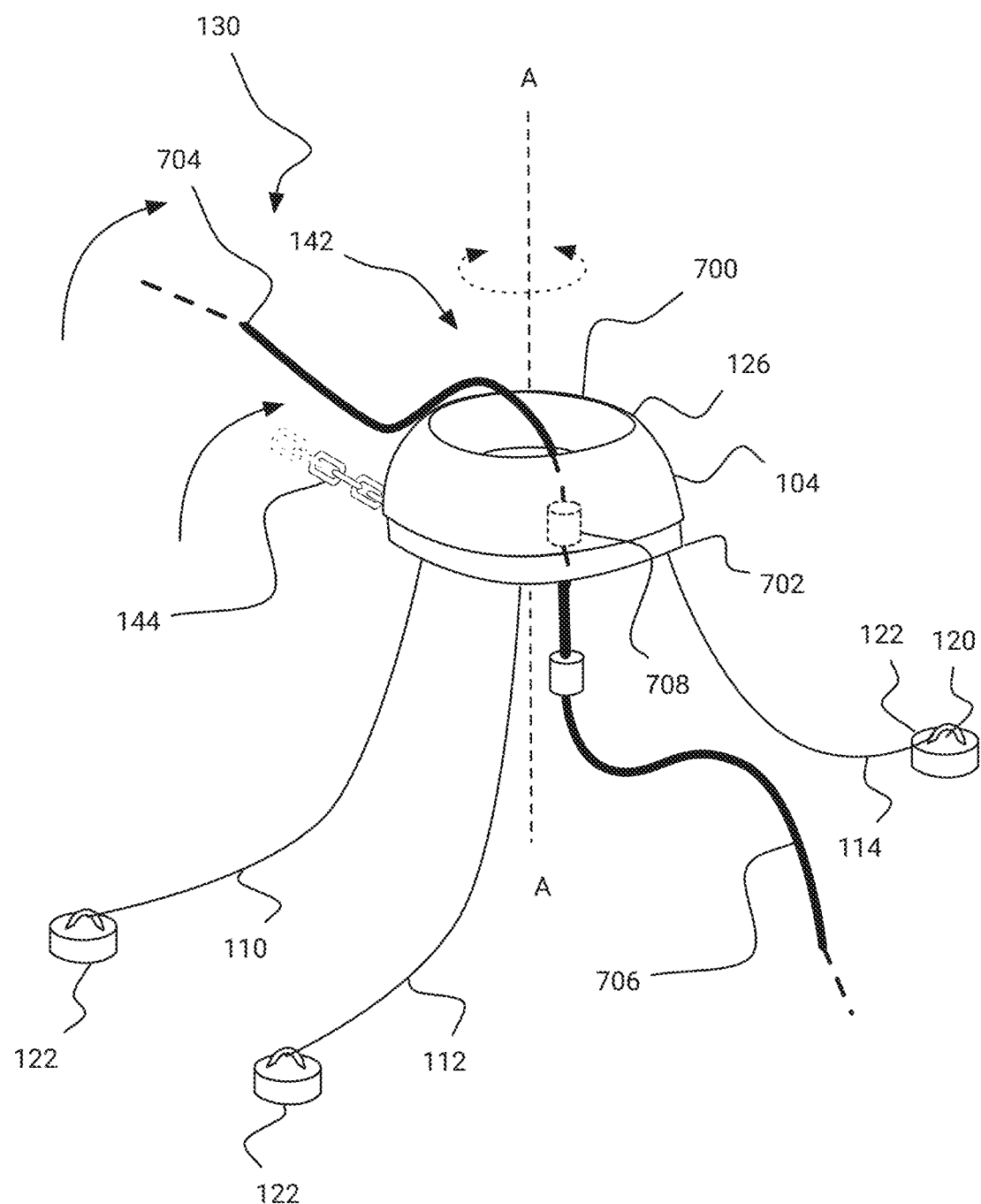
FIG. 7 shows a perspective view of a mooring buoy according to an example.

In some examples, the electric cable 130 comprises a rotatable electrical connection 708 is mounted on the mooring buoy 100 (as best shown in FIG. 7) for permitting relative rotation of a first part 704 of the electric cable 130 with respect to a second part 706 of the electric cable 130. For example, any part of the electric cable 130 can comprise the rotatable electrical connection 708. For example the rotatable electrical connection 708 can be mounted on the mooring buoy 100 and/or the rotatable electrical connection 708 can be mounted on the vessel 102. In other examples the rotatable electrical connection 708 can be any suitable electromechanical connection configured to permit mechanical rotation of the first part 704 of the electric cable 130 with respect to the second part 706 of the electric cable 130 whilst maintaining electrical connection between the first part 704 of the electric cable 130 with respect to the second part 706 of the electric cable 130.

In some examples, the first part 704 of the electrical cable 130 is an output electrical cable 704. In some examples the second part 706 of the electrical cable 130 is an input subsea electric cable 706. The output electrical cable 704 is electrically connected to the input subsea electric cable 706.

A rotatable electrical connection 708 is mounted on the mooring buoy 100. In some examples, the rotatable electrical connection 708 can be mounted on the floating body 104. In other examples the rotatable electrical connection 708 can be mounted on any suitable stationary portion of the mooring buoy 100. In other examples, the rotatable electrical connection 708 is mounted on either the upper first portion 700 or the lower second portion 702 of the floating body 104.

In yet more examples the rotatable electrical connection 708 can be mounted to the buoy anchoring lines 110, 112, 114 or any other part of the mooring buoy 100 that remains relatively stationary with respect to the sea floor 108. Alternatively, the rotatable electrical connection 708 can be mounted on one or more floatation devices 124 or struts 128 or other structure of the floating body 104.

In some examples the rotatable electrical connection 708 is an electrical slip ring 708. The electrical slip ring 708 can be housed in an electrical slip ring canister (not shown). The electrical slip ring canister can seal the electrical connections of the electrical slip ring 708 from the marine environment. The electrical slip ring 708 permits 360° rotation of the first part 704 of the electric cable 130 with respect to the second part 706 of the electric cable 130.

In some examples, the electrical slip ring 708 is mounted between two rotating portions of the mooring buoy 100. For example, electrical slip ring 708 is mounted between upper first portion 700 or the lower second portion 702 of the floating body 104. This means that the first part 704 of the electric cable 130 is rotatable with respect to the second part 706 of the electric cable 130 whilst maintaining an electrical connection between the output electrical cable 704 and the input subsea electric cable 706.

By allowing the first part 704 of the electric cable 130 to rotate with respect to the second part 706 of the electric cable 130, the first and the second parts 704, 706 of the electrical cable 130 the tension in the electrical cable 130 is reduced when the vessel 102 weathervanes about the mooring buoy. Accordingly tension from the electrical cable 130 twisting about its longitudinal axis is avoided. This means that the rotatable electrical connection 708 also contributed to reducing the tension in electrical cable 130 below the tension in the vessel mooring line 144.

Turning to FIG. 8, the connection of the electric cable 130 to the power supply 800 will be discussed in further detail. FIG. 8 shows a schematic diagram of a mooring buoy 100a, 100b, 100c connected to a land-based power supply 800. The plurality of mooring buoys 100a, 100b, 100c are the same as the mooring buoy 100 discussed in reference to FIGS. 1 to 7.

The first mooring buoy 100a is connected to a first transformer 802 via a first electric cable 130a. The second and third mooring buoys 100b, 100c are connected to a second transformer 804 via a second electric cable 130b. The first and second electric cables 130a, 130b are the same as the electric cable 130 as discussed in reference to FIGS. 1 to 7.

The first, second and third mooring buoys 100a, 100b, 100c are respectively connected to a first, second and third vessel 806, 808, 810. The first, second and third mooring buoys 100a, 100b, 100c are arranged in a mooring pattern in the coastal water 826 near the shore 824.

The first and second transformers 802, 804 are connected to the same electrical substation 812 which is connected to an electricity distribution network and/or a power supply 800. The power supply can be a land-based power supply or an offshore based power supply. In some examples, the power supply is a renewable energy source such as wind turbine generator, solar cells, tidal or wave generators or any other suitable renewable energy source.

The first and second transformers 802, 804 are configured to output electrical power at different voltages. In this way, different voltages can be supplied to different mooring buoys or different clusters of mooring buoys. This means that different vessels 806, 808, 810 can use the mooring buoys 100a, 100b, 100c even though they may operate a vessel based electric distribution system at different voltages. In other examples, the first and second transformers 802, 804 are configured to deliver electrical power at the same voltage. In some examples, the first transformer 802 outputs the voltage at 440V. In some examples, the second transformer 804 outputs the voltage at 690V. In other examples there can be any number of transformers outputting at any required voltages.

In some examples, there is a controller 814 for controlling the first and second transformers 802, 804. The controller 814 sends a signal to control the output voltage of the first and/or second transformer 802, 804 via control connections 820, 822. This means that the controller 814 can change the output voltage of the mooring buoys 100a, 100b, 100c dynamically. For example the controller 814 can change the output voltage of the transformers in dependence of the different types of vessel 806, 808, 810 being moored at the mooring buoys 100a, 100b, 100c.

In some examples, the controller 814 receives parameter information for determining the output voltage of the first and second transformers 802, 804. The parameter information is a vessel parameter including the operating voltage of the vessel.

In some examples, the controller 814 receives manual input for controlling output voltage of the transformers 802, 804. Alternatively, the controller 814 uses a mooring schedule for vessels 806, 808, 810 to determine the output voltage of the first and second transformers 802, 804.

In some examples, the electric cables 130a, 130b also comprise one or more data signals. Alternatively or additionally, the electric cables 130a, 130b also comprise a data cable 818. The data signal comprises the vessel parameter information. In some examples the vessel parameter information is sent via the data cable 818 and/or the electric cable 130a, 130b from the vessel 806. Alternatively, the vessel parameter information is optionally sent from a satellite controller 816 which is mounted on the mooring buoy 100a.

The vessel parameter information is sent to the controller 814 before the electric cables 130a, 130b are energised. This means that the correct output voltage can be selected before the electric cables 130a, 130b are live.

In another example two or more examples are combined. Features of one example can be combined with features of other examples.

Examples of the present invention have been discussed with particular reference to the examples illustrated. However it will be appreciated that variations and modifications may be made to the examples described within the scope of the invention.

The invention claimed is:

1. A mooring buoy for a vessel, the mooring buoy comprising:
    a floating body arranged to project out of a surface of water;
    at least one buoy anchoring line connected between the floating body and a sea floor;
    at least one vessel mooring line connectable between the mooring buoy and the vessel; and
    at least one moveable electric cable connected to a power supply, the at least one moveable electric cable having a free end connectable to a switchboard of the vessel when the vessel is tethered to the at least one vessel mooring line;
    wherein the free end of the at least one moveable electric cable is moveable between a retracted position and a connected position and a tension of the at least one vessel mooring line is greater than the tension in the at least one moveable electric cable when the free end of the at least one moveable electric cable is in the connected position; and
    wherein the mooring buoy includes a rotatable electrical connection coupled between the at least one moveable electric cable and an input subsea cable.

2. The mooring buoy according to claim 1, wherein the rotatable electrical connection is an electrical slip ring.

3. The mooring buoy according to claim 2, wherein the electrical slip ring is sealed in a canister configured to shield a marine environment from the electrical slip ring.

4. The mooring buoy according to claim 1, wherein the free end of the at least one moveable electric cable is adjacent to the floating body in the retracted position.

5. The mooring buoy according to claim 1, wherein the free end of the at least one moveable electric cable is arranged to retract towards the floating body when disconnected from the vessel.

6. The mooring buoy according to claim 5, wherein the at least one moveable electric cable is arranged to retract due to a weight of the at least one moveable electric cable.

7. The mooring buoy according to claim 5, wherein the at least one moveable electric cable comprises a clump weight mounted on a portion of the at least one moveable electric cable.

8. The mooring buoy according to claim 1, wherein the floating body comprises a curved surface for limiting a bend radius of the at least one moveable electric cable.

9. The mooring buoy according to claim 1, wherein the floating body comprises a chute for receiving the at least one moveable electric cable.

10. The mooring buoy according to claim 1, wherein the at least one vessel mooring line is retractable towards the floating body.

11. The mooring buoy according to claim 1, wherein the at least one vessel mooring line includes at least one of a line, a wire, or a chain.

12. The mooring buoy according to claim 1, wherein the free end of the at least one moveable electric cable comprises a magnetic connector.

13. The mooring buoy according to claim 1, wherein the free end of the at least one moveable electric cable comprises at least one of an electrical plug or an induction loop.

14. The mooring buoy according to claim 1, wherein the at least one moveable electric cable is connected to a transformer arranged to vary a voltage of the power supply depending on a vessel parameter.

15. The mooring buoy according to claim 14, wherein a controller is configured to send a control signal to the transformer to vary the voltage of the at least one moveable electric cable depending on the vessel parameter.

16. The mooring buoy according to claim 14, wherein the transformer is configured to supply the voltage at 440V or 690V.

17. The mooring buoy according to claim 1, wherein the at least one buoy anchoring line includes three buoy anchoring lines.

18. The mooring buoy according to claim 1, wherein the at least one moveable electric cable and the at least one vessel mooring line are rotatable about a central axis of the floating body.

19. The mooring buoy according to claim 18, wherein the at least one moveable electric cable and the at least one vessel mooring line are rotatable 360 degrees about the central axis of the floating body.

20. A power system for an offshore vessel, the power system comprising:
    at least one mooring buoy according to claim 1; and
    a transformer connected to the at least one mooring buoy and a power supply.

21. The power system according to claim 20, wherein the at least one mooring buoy includes a plurality of mooring buoys.

22. A method of mooring a vessel with a mooring buoy having a floating body arranged to project out of a surface of water and at least one buoy anchoring line connected between the floating body and a sea floor, wherein the method comprises:
    connecting at least one vessel mooring line between the mooring buoy and the vessel;

moving a free end of at least one moveable electric cable connected to a power supply between a retracted position and a connected position;

connecting the free end of the at least one moveable electric cable to a switchboard of the vessel when the vessel is tethered to the at least one vessel mooring line, wherein the mooring buoy includes a rotatable electrical connection coupled between the at least one moveable electric cable and an input subsea cable; and tensioning the at least one vessel mooring line such that a tension in the at least one vessel mooring line is greater than the tension in the at least one moveable electric cable when the free end of the at least one moveable electric cable is in the connected position.

* * * * *